United States Patent Office 3,123,590
Patented Mar. 3, 1964

3,123,590
TITANOUS ION AS A REDUCTANT IN EMULSION POLYMERIZATION SYSTEMS
Carl A. Uraneck and Ollie G. Buck, Bartlesville, Okla., assignors to Phillips Petroleum Company, a corporation of Delaware
No Drawing. Filed June 27, 1957, Ser. No. 668,331
17 Claims. (Cl. 260—84.1)

This invention relates to a new polymerization system, more specifically, to the use of titanous ion as a reductant in emulsion polymerization systems.

The applicants recognize that a great many polymerization systems are known in the art. The present invention relates to a new polymerization system using titanous ion as the reductant, this system making possible the production of polymers containing substantially no iron. Furthermore, the use of this invention provides systems having good polymerization rates at low temperatures.

The following are objects of our invention.

An object of our invention is to polymerize unsaturated organic compounds. Another object of this invention is to produce synthetic rubber. A further object of this invention is to produce polymers of high molecular weight which are free of iron.

Other objects and advantages of this invention will become apparent to one skilled in the art upon reading this disclosure.

As stated, we have discovered that polymerization can be effected in the so-called redox polymerization systems by using titanous ion as a reductant. Previous attempts to use titanium salts have been unsuccessful but we have solved this problem by using an additional ingredient, a complexing agent which complexes with the titanous ion.

The invention is broadly applicable to the production of synthetic rubber prepared by polymerizing a monomeric material comprising a major amount of a conjugated diene such as 1,3-butadiene, in aqueous emulsion in the presence of a catalyst composition comprising essentially an organic hydroperoxide having from 6 to 30, inclusive, carbon atoms per molecule. The activator composition comprises essentially a trivalent salt of titanium and a complexing agent which complexes with the titanous ion.

In our invention, the titanium compound reductant is a trivalent titanium compound which is at least partially soluble in water. Examples of such compounds include titanium trifluoride, titanium tribromide, titanium trichloride, and titanous sulfate. As the complexing agents, we use a material which complexes with the titanium ion. Such materials include alkali metal pyrophosphate such as sodium pyrophosphate or potassium pyrophosphate, ethylenediamine tetraacetic acid and its alkali metal and ammonium salts, N-hydroxyethylethylenediamine triacetic acid, tartaric acid, citric acid, trisodium phosphate, potassium fluoride, potassium oxalate, and polyoxyethylene sorbitan monooleate. The polyoxyethylene sorbitan monooleate serves the dual purpose of complexing with the titanous ion and providing the emulsifier for the polymerization system. When such a compound is used, an additional emulsifying agent is not required although one can be used as desired.

An activator system containing a titanous compound and a complexing agent can be increased in activity in some instances by the presence of zinc ion. The zinc ion is particularly effective in systems in which an alkali metal pyrophosphate is employed as the complexing agent, and it may be present up to amounts which are slightly in excess of the amount on a mol basis of complexing agent. Generally, the maximum amount of zinc ion will not exceed 1.1 mols per mol of the complexing agent.

The oxidizing components used in the emulsion polymerization systems of this invention are organic hydroperoxides, or hydroperoxymethanes, which contain from 6 to 30 carbon atoms per molecule. They can be represented by the formula

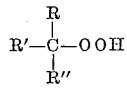

wherein R is either hydrogen or an organic radical, and each of R' and R" is an organic radical, or R' and R" together comprise a tetramethylene or pentamethylene group forming with the

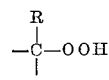

a cyclopentyl- or cyclohexylhydroperoxide. Each of R, R', and R" can be completely hydrocarbon in character, and can be of mixed character, such as aralkyl, alkaryl, and the like, and can also have non-hydrocarbon substituents. Hydroperoxides which can be employed are the same as described in U.S. Patent 2,614,098 of C.A. Uraneck and S. H. Landes.

The amount of complexing agent employed in the activator system is generally in the range between 0.25 and 6 mols per mol of titanous ion, preferable in the range between one and three mols per mol of titanous ion.

The amounts of titanous compound and hydroperoxide are generally expressed in terms of the monomers charged and will usually be in the range between 0.005 and 4.0 millimole parts per 100 parts by weight of monomers.

The level of activator and initiator ingredients used will be governed by a number of factors including the reactivity of the monomers, purity of the monomers, rate of polymerization desired, and the polymerization temperature.

Polymerization temperatures may range from —40 to 160° F. The level of initiator and activator ingredients will be determined to some extent by the polymerization temperature. When temperatures below the freezing point of the aqueous phase are employed, an antifreeze agent such as an alcohol is added to the system.

Polymerization can be effected in either acidic or alkaline medium, i.e., at a pH in the range between 2 and 11. An emulsifier is selected which will be operable in the pH range chosen. Operable emulsifiers include fatty acid soaps, rosin acid soaps, alkyl sulfates, alkylaryl sulfonates, and non-ionic surface active agents.

The present invention is directed primarily to the production of polymers, of conjugated dienes, which have physical properties classifying them as synthetic rubber, and the invention is particularly applicable to the polymerization of hydrocarbon monomeric materials. Such materials include 1,3-butadiene and other conjugated diolefin hydrocarbons having not more than 8 carbon atoms per molecule, halogen derivatives, such as chloroprene, fluoroprene, and the like, either alone, in admixture with each other, or together with minor amounts of other unsaturated monomeric materials which are copolymerizable therewith in aqueous emulsion, such as aryl olefins, such as styrene, vinyl naphthalene; alpha-methylstyrene; para-chlorostyrene, dichlorostyrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride; vinylpyridine, etc. In this case, the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases, the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 percent or more of the alcohol present be in the aqueous phase. A high-boiling alcohol such as glycerine is difficult to recover from the resulting serum; a low-boiling alcohol such as methanol is easily removed and frequently preferred. Other aliphatic alcohols of higher boiling point than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove heat to maintain a desired reaction temperature. The polymerization may be conducted in batches, semi-continuously or continuously. The total pressure on the reactants is preferably at least as great as the total vapor pressure of the mixture, so that the initial reactants will be present in liquid phase. Usually 50 to 98 percent of the monomeric material is polymerized.

*Example I*

The following recipe was employed for the copolymerization of butadiene with styrene in an emulsion system at 41° F.

| | Parts by weight |
|---|---|
| Butadiene | 75. |
| Styrene | 25. |
| Water | 180. |
| Potassium fatty acid soap | 5. |
| KCl | 0.5. |
| Tert-dodecyl mercaptan | 0.23. |
| p-Menthane hydroperoxide | Variable. |
| $K_4P_2O_7$ | Do. |
| $TiCl_3$ [1] | Do. |

[1] Commercial solution having the following analysis:
| | |
|---|---|
| Titanium trichloride, wt. percent | 19.1 |
| Zinc chloride, wt. percent | 22.4 |
| Iron chloride, wt. percent | 0.43 |
| Hydrochloric acid, wt. percent | 7-9 |

Three runs were made in which the activator (mixture of $K_4P_2O_7$ and $TiCl_3$) was unaged and 3 in which it was aged 30 minutes at 60° C. Various activator levels were tried. Data are shown in the following table:

ACTIVATOR UNAGED

| Run No. | p-Menthane Hydroperoxide | | $K_4P_2O_7$ | | $TiCl_3$ | | Time, Hours, 60% Conversion |
|---|---|---|---|---|---|---|---|
| | Mmol | Grams | Mmol | Grams | Mmol | Grams | |
| 1 | 0.3 | 0.052 | 0.3 | 0.099 | 0.3 | 0.046 | 3.3 |
| 2 | 0.2 | 0.034 | 0.2 | 0.066 | 0.2 | 0.031 | 4.3 |
| 3 | 0.1 | 0.017 | 0.1 | 0.033 | 0.1 | 0.015 | 8.3 |

ACTIVATOR AGED 30 MINUTES AT 60° C.

| Run No. | p-Menthane Hydroperoxide | | $K_4P_2O_7$ | | $TiCl_3$ | | Time, Hours, 60% Conversion |
|---|---|---|---|---|---|---|---|
| | Mmol | Grams | Mmol | Grams | Mmol | Grams | |
| 4 | 0.3 | 0.052 | 0.3 | 0.099 | 0.3 | 0.046 | 4.3 |
| 5 | 0.2 | 0.034 | 0.2 | 0.066 | 0.2 | 0.031 | 6.3 |
| 6 | 0.1 | 0.017 | 0.1 | 0.033 | 0.1 | 0.015 | 10.1 |

*Example II*

A solution of pure titanium trichloride was prepared by the electrolytic reduction of titanium tetrachloride in accordance with the following procedure: 25 grams of titanium tetrachloride was added to 35 ml. of cold concentrated hydrochloric acid and the mixture was diluted with 75 ml. of distilled water. The anode was a graphite rod encased in a sintered glass Gooch crucible, medium porosity, containing 4 molar hydrochloric acid. The cathode was a thin lead sheet amalgamated by rubbing with mercuric chloride. A current of one ampere was passed through the cell and reduction proceeded very smoothly. The resulting 0.99 molar solution was stored in a nitrogen atmosphere in a container fitted with a crown cap seal and wrapped to exclude light.

The pure $TiCl_3$ solution was used in a series of butadiene/styrene copolymerization runs in aqueous emulsions at 41° F. Two complexing agents were employed, potassium pyrophosphate and Versene Regular (sodium salt of ethylenediamine tetraacetic acid). The polymerization recipe was as follows:

| | Parts by weight |
|---|---|
| Butadiene | 75. |
| Styrene | 25. |
| Water | 180. |
| Potassium fatty acid soap | 5. |
| KCl | 0.5. |
| Tert-dodecyl mercaptan | 0.26. |
| p-Menthane hydroperoxide | 0.034 (0.2 mmol). |
| $TiCl_3$ [1] | 0.031 (0.2 mmol). |
| $K_4P_2O_7$ | Variable. |
| Versene Regular | Do. |

[1] $TiCl_3$ prepared by the electrolytic reduction of $TiCl_4$ and diluted with water so that 1.0 ml. of dilute solution contained 0.1 mmol of $TiCl_3$.

The time-conversion data using variable quantities of each complexing agent are shown below:

| Run No. | $K_4P_2O_7$ | | Versene Regular | | Conversion, percent at— | |
|---|---|---|---|---|---|---|
| | Mmol | Grams | Mmol | Grams | 4.5 Hours | 7.0 Hours |
| 1 | 0.3 | 0.099 | | | 37 | 55 |
| 2 | 0.2 | 0.066 | | | 30 | 45 |
| 3 | 0.134 | 0.044 | | | 35 | 50 |
| 4 | 0.067 | 0.022 | | | 47 | 61 |
| 5 | | | 0.3 | 0.114 | 27 | 48 |
| 6 | | | 0.2 | 0.076 | 24 | 41 |
| 7 | | | 0.134 | 0.051 | 24 | 38 |
| 8 | | | 0.067 | 0.025 | 28 | 40 |

*Example III*

The recipe of Example II was followed using 0.2 mmol of pure $TiCl_3$ and various complexing agents. The following table shows the different complexing agents, their amounts, and the time-conversion data:

| Run No. | Complexing Agent | | Conversion, Percent at— | | | |
|---|---|---|---|---|---|---|
| | Type | Mmol | Grams | 3 hrs. | 5.5 hrs. | 7 hrs. | 27 hrs. |
| 1 | $Na_4P_2O_7 \cdot 7H_2O$ | 0.2 | 0.09 | 21 | 33 | 42 | 94 |
| 2 | Tartaric acid | 0.2 | 0.03 | 24 | 31 | 33 | 49 |
| 3 | Citric acid | 0.2 | 0.038 | 14 | 18 | 19 | 19 |
| 4 | $Na_3PO_4 \cdot 12H_2O$ | 0.2 | 0.076 | 6 | 13 | 21 | 58 |
| 5 | $KF \cdot 2H_2O$ | 1.2 | 0.114 | 25 | 26 | 27 | 26 |
| 6 | $K_2C_2O_4 \cdot H_2O$ | 0.2 | 0.036 | 20 | 27 | 30 | 35 |

*Example IV*

A series of polymerization runs was made to study the effect of variable mol ratios of 3 complexing agents to titanium trichloride. The titanium trichloride level was held at 0.2 mmol and the amounts of complexing agents were varied from 0.034 to 0.6 mmol. The 41° F. emulsion polymerization recipe was the same as that employed in Example II. The following table shows the type and amount of complexing agent employed and the time-conversion data:

| Run No. | Complexing Agent | | | Conversion, Percent at— | | | |
|---|---|---|---|---|---|---|---|
| | Type | Mmol | Grams | 1.5 hrs. | 3.5 hrs. | 5.5 hrs. | 8.5 hrs. |
| 1 | $K_4P_2O_7$ | 0.034 | 0.011 | 18 | 30 | 34 | 47 |
| 2 | $K_4P_2O_7$ | 0.067 | 0.022 | 19 | 38 | 43 | 59 |
| 3 | $K_4P_2O_7$ | 0.134 | 0.044 | 12 | 26 | 34 | 46 |
| 4 | $K_4P_2O_7$ | 0.2 | 0.066 | 9 | 25 | 31 | 44 |
| 5 | $K_4P_2O_7$ | 0.3 | 0.099 | 15 | 31 | 36 | 53 |
| 6 | $K_4P_2O_7$ | 0.6 | 0.198 | 15 | 33 | 42 | 61 |
| 7 | Versene Regular [1] | 0.034 | 0.0125 | 14 | 22 | 24 | 34 |
| 8 | do.[1] | 0.067 | 0.025 | 11 | 20 | 26 | 40 |
| 9 | do.[1] | 0.134 | 0.051 | 10 | 21 | 29 | 46 |
| 10 | do.[1] | 0.2 | 0.076 | 10 | 20 | 30 | 53 |
| 11 | do.[1] | 0.3 | 0.114 | 8 | 16 | 29 | 62 |
| 12 | do. | 0.6 | 0.228 | 4 | 17 | 24 | 54 |
| 13 | Versen-OL [2] | 0.034 | 0.014 [3] | 10 | 21 | 28 | 53 |
| 14 | do.[2] | 0.067 | 0.028 [3] | 15 | 34 | 54 | 73 |
| 15 | do.[2] | 0.134 | 0.056 [3] | 17 | 35 | 53 | 68 |
| 16 | do.[2] | 0.2 | 0.083 [3] | 19 | 45 | 62 | 71 |
| 17 | do.[2] | 0.3 | 0.124 [3] | 20 | 52 | 61 | 67 |
| 18 | do.[2] | 0.6 | 0.248 [3] | 27 | 60 | 70 | 73 |

[1] As in Example II.
[2] N-hydroxyethylethylenediamine triacetic acid.
[3] Based on information supplied with sample.

*Example V*

A series of runs was made to determine the effect of aging the $TiCl_3$-Versen-OL activator (N-hydroxyethylethylenediamine triacetic acid). The following 41° F. polymerization recipe was employed.

| | Parts by weight |
|---|---|
| Butadiene | 75. |
| Styrene | 25. |
| Water | 180. |
| Potassium fatty acid soap | 5. |
| KCl | 0.5. |
| Tert-dodecyl mercaptan | 0.26. |
| Phenylcyclohexyl hydroperoxide | 0.038 (0.2 mmol). |
| $TiCl_3$ [1] | 0.031 (0.2 mmol). |
| Versen-OL (0.167 cc.) | 0.056 (0.2 mmol). |

[1] Prepared as described in Example II.

Results of several runs are shown in the following table:

| Run No. | Time of Aging Activator, Minutes | Conversion, Percent at— | | | |
|---|---|---|---|---|---|
| | | 2 Hours | 3.5 Hours | 5 Hours | 7.5 Hours |
| 1 | 1 | 28 | 54 | 63 | 69 |
| 2 | 10 | 34 | 68 | 81 | 86 |
| 3 | 20 | 36 | 71 | 90 | 95 |
| 4 | 30 | 37 | 69 | 86 | 90 |

*Example VI*

A series of polymerizations was run in which variable quantities of zinc chloride were added to pure titanous chloride prepared by the electrolytic reduction of titanium tetrachloride as described in Example II. Two control runs were made, one in which no zinc chloride was added and the other in which a commercial $TiCl_3$ solution, similar to that described in Example I, was used. Polymerization was effected at 41° F. in accordance with the following recipe:

| | Parts by weight |
|---|---|
| Butadiene | 75. |
| Styrene | 25. |
| Water | 180. |
| Potassium fatty acid soap | 5. |
| KCl | 0.7. |
| Tert-dodecyl mercaptan | 0.26. |
| p-Menthane hydroperoxide | 0.034 (0.2 mmol). |
| $TiCl_3$ | 0.031 (0.2 mmol). |
| $ZnCl_2$ | Variable. |
| $K_4P_2O_7$ | 0.066 (0.2 mmol). |

The following results were obtained.

| Run No. | $TiCl_3$ Used | $ZnCl_2$ | | Conversion, Percent at— | | | | |
|---|---|---|---|---|---|---|---|---|
| | | Grams | Mmol | 2 Hrs. | 4 Hrs. | 6 Hrs. | 8 Hrs. | 25 Hrs. |
| 1 | Commercial | | | 25 | 40 | 57 | 66 | 91 |
| 2 | Pure | | | 8 | 20 | 31 | 37 | 83 |
| 3 | do | 0.009 | 0.066 | 11 | 22 | 32 | 38 | 84 |
| 4 | do | 0.017 | 0.125 | 16 | 29 | 39 | 48 | 88 |
| 5 | do | 0.034 | 0.249 | 14 | 29 | 38 | 47 | 90 |

*Example VII*

A series of polymerizations was run at 41° F. using variable amounts of tert-dodecyl mercaptan. The recipe of Example VI was employed except that no zinc chloride was added and the $TiCl_3$ used was a commercial solution similar to that described in Example I. Results were as follows:

| Run No. | tert-Dodecyl Mercaptan Parts | Reaction Time, Hours | Conversion, Percent | Mooney Value ML-4 |
|---|---|---|---|---|
| 1 | 0.6 | 8.25 | 60 | 99 |
| 2 | 0.7 | 9.25 | 60 | 58 |
| 3 | 0.8 | 8.5 | 58 | 51 |
| 4 | 0.9 | 9.0 | 53 | 20 |
| 5 | 1.0 | 8.5 | 58 | 32 |
| 6 | 1.1 | 8.75 | 58 | 20 |

*Example VIII*

The following recipe was employed for the copolymerization of butadiene with styrene in an emulsion system at 41° F.

| | Parts by weight |
|---|---|
| Butadiene | 75 |
| Styrene | 25 |
| Water | 180 |
| Potassium fatty acid soap | 5 |
| KCl | 0.7 |
| Tert-dodecyl mercaptan | 0.9 |
| p-Menthane hydroperoxide | 0.034 |
| $TiCl_3$ [1] | 0.031 |
| $K_4P_2O_7$ | 0.066 |

[1] A commercial solution similar to that employed in Example I.

A series of runs was made (two in which a smaller amount of mercaptan was used, 0.7 and 0.8 part, respectively). Time, conversion, and Mooney value were as follows:

Average time, hours _____ 6.9
Average conversion, percent _____ 60.6
Average Mooney, ML-4 _____ 38

The rubber prepared as described above was compared with two conventionally prepared butadiene/styrene rubbers designated, for convenience, as follows:

A. Butadiene/styrene rubber containing 23.5 weight percent bound styrene; prepared in a peroxamine activated, fatty acid emulsified system at 41° F.; carbamate shortstopped; glue-acid coagulated; mean raw Mooney (ML-4) of fifty-five.

B. Butadiene/styrene rubber containing twenty weight percent bound styrene; prepared in a sugar free, iron activated, rosin soap emulsified system at 41° F.; carbamate shortstopped; salt-acid coagulated; mean raw Mooney (ML-4) of fifty-two.

The control rubbers were compounded at two levels of softener in order to have controls comparable to the experimental rubber in compounded Mooney and Shore hardness. Compounding recipes were as follows:

|  | Parts by Weight | |
|---|---|---|
|  | Experimental Rubber | Controls |
| Rubber | 100 | 100 |
| Carbon Black (Philblack O) | 50 | 50 |
| Zinc Oxide | 3 | 3 |
| Stearic Acid | 2 | 1 |
| Flexamine [1] | 1 | 1 |
| Circo-Para [2] | 5 | 5, 10 |
| Sulfur | 1.75 | 1.75 |
| Santocure [3] | 1.25 | Variable |

[1] Physical mixture containing sixty-five percent of a complex diarylamine-ketone reaction product and thirty-five percent of N,N'-diphenyl-p-phenylenediamine.
[2] A mixture of equal parts by weight of Circosol-2XH with Para Flux. Circosol-2XH: A petroleum hydrocarbon softener, containing hydrocarbons of high molecular weight, in the form of a heavy, viscous, transparent, pale green, odorless liquid of low volatility; sp. gr., 0.940; Saybolt Universal viscosity at 100° F., about 2000 seconds. Para Flux: Saturated polymerized hydrocarbon.
[3] N-cyclohexyl-2-benzothiazylsulfenamide.

The stocks were milled, cured thirty minutes at 307° F., and physical properties determined. Results were as follows:

|  | Experimental Rubber | Controls | | | |
|---|---|---|---|---|---|
|  |  | A | B | A | B |
| Ungaged Samples: | | | | | |
| Circo-Para | 5 | 5 | 5 | 10 | 10 |
| Santocure | 1.25 | 0.9 | 1.1 | 1.0 | 1.2 |
| Compression set, percent | 16.2 | 16.5 | 19.4 | 16.6 | 19.6 |
| 300% modulus, p.s.i., 80° F | 1,650 | 2,040 | 1,950 | 1,760 | 1,600 |
| Tensile, p.s.i., 80° F | 3,400 | 3,700 | 3,750 | 3,550 | 3,460 |
| Elongation, percent, 80° F | 500 | 470 | 500 | 485 | 540 |
| 200° F. maximum tensile, p.s.i. | 1,630 | 1,700 | 1,880 | 1,680 | 1,580 |
| $\Delta$T, °F | 63.8 | 58.5 | 61.5 | 56.5 | 58.5 |
| Resilience, percent | 62.7 | 63.4 | 62.4 | 62.0 | 62.6 |
| Flex life, thousands of flexures to failure | 25.5 | 28.8 | 44.0 | 24.0 | 27.0 |
| Shore hardness | 63 | 66.5 | 65 | 63 | 60 |
| Abrasion loss, grams | 7.75 | 5.64 | 5.96 | 6.59 | 8.16 |
| Ozone rating [1] | 4 | 8 | 9 | 9 | 9 |
| Gehman freeze point, °F | −56 | −52 | −50 | −50 | −50 |
| Compounded MS 1½ at 212° F | 32.5 | 39 | 39 | 33 | 33 |
| Oven Aged 24 Hours at 212° F: | | | | | |
| 300% modulus, p.s.i., 80° F | 2,470 | 2,920 | 2,950 | 2,950 | 2,380 |
| Tensile, p.s.i., 80° F | 2,850 | 3,320 | 3,170 | 3,240 | 3,240 |
| Elongation, percent, 80° F | 330 | 335 | 320 | 370 | 395 |
| $\Delta$T, °F | 55.1 | 51.7 | 52.4 | 50.0 | 50.3 |
| Resilience, percent | 66.8 | 70.5 | 67.7 | 69.8 | 67.8 |
| Flex life, thousands of flexures to failure | 4.8 | 3.1 | 3.7 | 4.1 | 7.5 |
| Shore hardness | 70 | 72 | 71 | 70 | 66.5 |
| Abrasion loss, grams | 6.02 | 4.82 | 4.89 | 5.69 | 5.70 |
| Oven Aged 3 Days at 212° F.: | | | | | |
| Tensile, p.s.i., 80° F | 2,600 | 3,030 | 3,270 | 3,030 | 3,070 |
| Elongation, percent, 80° F | 260 | 250 | 265 | 290 | 310 |
| Abrasion loss, grams | 5.77 | 4.60 | 4.75 | 5.62 | 5.78 |
| Oven Aged 7 Days at 212° F.: | | | | | |
| Tensile, p.s.i., 80° F | 2,660 | 2,780 | 3,200 | 2,860 | 2,730 |
| Elongation, percent, 80° F | 230 | 210 | 265 | 250 | 240 |
| Aged in Air Bomb 16 Hours at 260° F. and 80 p.s.i.: | | | | | |
| 300% modulus, p.s.i., 80° F | 2,260 | 2,630 | 2,920 |  | 2,530 |
| Tensile, p.s.i., 80° F | 2,900 | 2,870 | 3,125 | 2,120 | 2,850 |
| Elongation, percent, 80° F | 375 | 340 | 325 | 285 | 340 |

[1] Relative rating at 7 days: 0=no cracks; 10=many deep cracks.

*Example IX*

Butadiene was copolymerized with styrene in aqueous emulsion at 41° F. in accordance with the following recipe:

|  | Parts by weight |
|---|---|
| Butadiene | 75. |
| Styrene | 25. |
| Water | 180. |
| C9446-N [1] | 5. |
| Tert-dodecyl mercaptan | 0.1 |
| p-Menthane hydroperoxide | 0.17 (1 mmol). |
| $TiCl_3$ [2] | 0.15 (1 mmol). |

[1] Non-ionic emulsifier: polyoxyethylene sorbitan monooleate.
[2] As in Example I.

A conversion of 28.3 percent was reached in 11 hours.

*Example X*

The following 41° F. emulsion polymerization recipe was employed for the copolymerization of butadiene with styrene:

|  | Parts by weight |
|---|---|
| Butadiene | 75 |
| Styrene | 25 |
| Water | 180 |
| Potassium fatty acid soap | 5 |
| Tert-dodecyl mercaptan | 0.23 |
| p-Menthane hydroperoxide | 0.019 |
| $TiCl_3$ [1] | 0.02 |
| Sesquestrene AA [2] | 0.04 |
| KCl | 0.5 |
| Sodium formaldehyde sulfoxylate | 0.02 |

[1] As in Example I.
[2] Ethylenediamine tetraacetic acid.

A conversion of 38 percent was reached in 7 hours.

*Example XI*

Using the polymerization recipe of Example III, a series of runs was made to demonstrate the necessity for the complexing agent. In each of these runs, polymerization was effected at 41° F. and the titanium trichloride of Example II was used. In two of these runs, complexing agents were used while in the third no complexing agent was used. The data for these runs are set forth in the following table:

| Run No. | Complexing Agent | | Conversion, Percent at— | |
|---|---|---|---|---|
|  | Type | Parts | 3.16 Hours | 5.8 Hours |
| 1 | $K_4P_2O_7$ | 0.066 | 19 | 33 |
| 2 | Versene Regular | 0.076 | 20 | 38 |
| 3 |  |  | 6 | 7 |

*Example XII*

Further demonstration of the necessity for using a complexing agent is set forth in this example wherein a series of runs was made at 41° F. using the recipe of Example II and the electrolytically reduced $TiCl_3$. The data for these runs are set forth in the following table.

| Run No. | KOH Parts | Complexing Agent | | Conversion, Percent at— | | | | |
|---|---|---|---|---|---|---|---|---|
|  |  | Type | Parts | 1 Hours | 2.5 Hours | 4 Hours | 5.5 Hours | 13 Hours |
| 1 |  | $K_4P_2O_7$ | 0.066 | 7 | 21 | 28 | 35 | 73 |
| 2 | .07 | $K_4P_2O_7$ | 0.066 | 9 | 24 | 33 | 44 | 80 |
| 3 |  | Versene Reg | 0.076 | 3 | 11 | 16 | 27 | 68 |
| 4 | .07 | Versene Reg | 0.076 | 3 | 9 | 15 | 20 | 59 |
| 5 |  | Versene OL | 0.083 | 19 | 41 | 61 | 68 | 73 |
| 6 | .05 |  |  | 2 | 2 | 4 |  | 9 |

Example XIII

A series of runs were made to prepare rubber according to the following recipe and to compare the products of the present invention with rubber prepared by other widely used polymerization systems. In this work, all of the polymers were prepared at 41° F. and, in the first run, commercial titanium trichloride was used. The recipes for these rubbers were as follows, all parts being given in parts by weight:

|  | Run 1<br>Titanium Pyrophosphate | Run 2<br>Ferrous Pyrophosphate | Run 3<br>Sulfoxylate |
|---|---|---|---|
| Butadiene | 75 | 70 | 70 |
| Styrene | 25 | 30 | 30 |
| Water | 180 | 180 | 180 |
| Potassium fatty acid soap | 5 | 5 | 5 |
| KOH |  | 0.032 |  |
| KCl | 0.7 | 0.5 | 0.5 |
| tert-Dodecyl mercaptan | 0.9 | 0.29 | 0.3 |
| Cumene hydroperoxide |  | 0.08 | 0.02 |
| p-Menthane hydroperoxide | 0.034 |  |  |
| TiCl3 | 0.031 |  |  |
| FeSO4·7H2O |  | 0.139 | 0.02 |
| Versene, Regular |  |  | 0.052 |
| K4P2O7 | 0.066 | 0.165 |  |
| Sodium formaldehyde sulfoxylate |  |  | 0.02 |

The resulting polymers were analyzed, the results being set forth in the following table:

| Run. No. | Average Reaction Time, Hours | Conversion, Percent | Mooney Viscosity ML-4 | Soap, Percent | Acid, Percent | Ash, Percent | Iron, Percent | Gel, Percent | Inherent Viscosity |
|---|---|---|---|---|---|---|---|---|---|
| 1 | 7.5 | 60 | 116 | 0.38 | 0.42 | 0.28 | 0.003 | 0 | 2.99 |
| 2 | 7.9 | 58 | 71 | 0.15 | 0.23 | 0.35 | 0.039 | 0 | 2.15 |
| 3 | 11.3 | 60 | 46 | 0.25 | 0.27 | 0.29 | 0.007 | 0 | 1.72 |

To determine the stability of rubber prepared according to our invention when compared to rubber prepared using ferrous pyrophosphate, the products from runs 1 and 2 were compounded, cured, and exposed to a heated oxygen or nitrogen atmosphere for varying lengths of time. Thereafter, tests were made to determine the stability of each of the rubbers. The swelling index of the cured products was determined according to the method described by Kraus in Rubber World, 135, 67–73, 254–260 (1956).

The compounding recipe was as follows:

| | Parts by weight |
|---|---|
| Rubber | 100 |
| ZnO | 3 |
| Stearic acid | 1 |
| Sulfur | 1.75 |
| Santocure [1] | 1 |
| Phenyl-beta-naphthylamine | 2 |

[1] As in Example VIII.

The same mixing cycle was used for each product and the compounded materials were cured at 307° F. for 30 minutes. Portions of each of the cured products were heated in oxygen or nitrogen at 250° F. for varying lengths of time. Thereafter, the method of Kraus discloses, each portion was immersed in n-heptane for 6 days after which volume rubber in the swollen gel ($V_R$) was determined and swelling index ($\nu \times 10^4$) in mol/cc. calculated. The results are shown in the following table.

| Time (hours) | Environment | Ti-Pyrophosphate | | Fe-Pyrophosphate | |
|---|---|---|---|---|---|
| | | $V_r$ | $\nu \times 10^4$ (mol/cc.) | $V_r$ | $\nu \times 10^4$ (mol/cc.) |
| 0.00 | O2 | 0.4123 | 1.50 | 0.4263 | 1.68 |
| 3.02 | O2 | 0.4290 | 1.74 | 0.4411 | 1.92 |
| 7.35 | O2 | 0.4411 | 1.92 | 0.4501 | 2.08 |
| 24.66 | O2 | 0.4433 | 1.98 | 0.4645 | 2.36 |
| 46.95 | O2 | 0.4782 | 2.65 | 0.7566 | |
| 71.20 | O2 | 0.5852 | 6.50 | 0.9941 | |
| 94.22 | O2 | 0.9931 | | 0.9876 | |
| 121.09 | O2 | 0.9916 | | 0.9891 | |
| 0.00 | N2 | 0.4123 | 1.50 | 0.4263 | 1.68 |
| 3.15 | N2 | 0.4143 | 1.52 | 0.4311 | 1.75 |
| 9.04 | N2 | 0.4184 | 1.58 | 0.4271 | 1.70 |
| 24.80 | N2 | 0.4159 | 1.55 | 0.4293 | 1.74 |
| 48.59 | N2 | 0.4181 | 1.58 | 0.4358 | 1.85 |
| 72.17 | N2 | 0.4298 | 1.75 | 0.4601 | 2.27 |
| 96.95 | N2 | 0.4294 | 1.74 | 0.4660 | 2.38 |
| 115.16 | N2 | 0.4343 | 1.80 | 0.4744 | 2.55 |

It is not possible to calculate the swelling index when the value of the rubber in the swollen gel is above 0.66. For an ideal rubber, the values for the volume rubber in the swollen gel and the swelling index would remain constant. With such constant reading, the other properties of the rubber such as modulus, tensile, resilience, flex life, etc., would remain at their optimum value. From the data in the above table, it will be seen that the values remain much more constant for the rubber prepared using the titanium salt. The rise in these values is much less pronounced than when the iron recipe is used.

Comparison of runs 1 and 3 shows that the method of the present invention gives the same conversion as the sulfoxylate recipe in a much shorter time.

As many possible embodiments may be made of this invention without departing from the scope thereof, it is to be understood that all matter herein set forth is to be interpreted as illustrative and not as unduly limiting the invention.

We claim:

1. A process for producing a synthetic rubber, which comprises polymerizing a monomeric material comprising a major amount of a conjugated diene having not more than eight carbon atoms per molecule in an aqueous medium in the presence of a catalyst composition consisting essentially of an organic hydroperoxide having from six to thirty, inclusive, carbon atoms per molecule and an activator consisting essentially of an inorganic trivalent salt of titanium, said salt being at least partially water soluble, and a complexing agent selected from the group consisting of sodium pyrophosphate, potassium pyrophosphate, ethylenediamine tetraacetic acid, and alkali metal and ammonia salts thereof, N-hydroxyethylethylenediamine triacetic acid, tartaric acid, citric acid, trisodium phosphate, potassium fluoride, potassium oxalate, and polyoxyethylene sorbitan monooleate.

2. The process of claim 1 wherein said salt of titanium is selected from the group consisting of titanium trifluoride, titanium tribromide, titanium trichloride, and titanous sulfate.

3. The process of claim 1 wherein there is employed a water-soluble zinc salt in an amount not exceeding 1.1 mols per mol of said complexing agent.

4. A process for producing a synthetic rubber, which comprises polymerizing a monomeric material comprising a major amount of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially of an inorganic trivalent salt of titanium, said salt being at least partially water soluble, and sodium pyrophosphate.

5. A process for producing a synthetic rubber, which comprises polymerizing a monomeric material comprising a major portion of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially of an inorganic trivalent salt of titanium, said salt being at least partially water soluble, and potassium pyrophosphate.

6. A process for producing a synthetic rubber, which comprises polymerizing a monomeric material comprising a major portion of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially or an inorganic trivalent salt of titanium, said salt being at least partially water soluble, and ethylenediamine tetraacetic acid.

7. A process for producing a synthetic rubber, which comprises polymerizing a monomeric material comprising a major portion of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially of an inorganic trivalent salt of titanium, said salt being at least partially water soluble, and N-hydroxyethylethylenediamine triacetic acid.

8. A process for producing a synthetic rubber, which comprises polymerizing a monomeric material comprising a major portion of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially of an inorganic trivalent salt of titanium, said salt being at least partially water soluble, and trisodium phosphate.

9. A process for producing a synthetic rubber, which comprises polymerizing a monomeric material comprising a major portion of a conjugated diene having not more than eight carbon atoms per molecule in an aqueous medium in the presence of an ionic emulsifier and a catalyst composition consisting essentially of an organic hydroperoxide having from six to thirty, inclusive, carbon atoms per molecule and an activator consisting essentially of an inorganic trivalent salt of titanium, said salt being at least partially water soluble, and the sodium salt of ethylenediamine tetraacetic acid.

10. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride and, per mol of titanium trichloride, 0.25 to 6 mols of potassium pyrophosphate.

11. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride and, per mol of titanium trichloride, 0.25 to 6 mols of sodium pyrophosphate.

12. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride, 0.25 to 6 mols of potassium pyrophosphate per mol of titanium trichloride and zinc chloride in an amount not exceeding 1.1 mols per mol of potassium pyrophosphate.

13. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride, 0.25 to 6 mols of sodium pyrophosphate per mol of titanium trichloride, and zinc chloride in an amount not exceeding 1.1 mols per mol of sodium pyrophosphate.

14. A polymerization process which comprises polymerizing a major portion of 1,3-butadiene and a minor portion of styrene in an aqueous emulsion in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride, and 0.25 to 6 mols of the sodium salt of ethylenediamine tetraacetic acid per mol of titanium trichloride.

15. A polymerization process which comprises polymerizing a major portion of 1,3-butadiene and a minor portion of styrene in an aqueous emulsion in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride and 0.25 to 6 mols of ethylenediamine tetraacetic acid per mol of titanium trichloride.

16. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of p-menthane hydroperoxide, and an activator consisting essentially of 0.005 to 4 millimols of titanium trichloride, and 0.25 to 6 mols of N-hydroxyethylenediamine triacetic acid per mol of titanium trichloride.

17. A polymerization process which comprises polymerizing a major portion of 1,3-butadiene and a minor portion of styrene in an aqueous medium in the presence of an ionic emulsifier and a catalyst composition consisting essentially of, based on one hundred parts by weight of the monomers, 0.005 to 4 millimols of an organic hydroperoxide having from six to thirty, inclusive, carbon atoms per molecule and an activator consisting essentially of 0.005 to 4 millimols of an inorganic trivalent salt of titanium, said salt being at least partially water soluble, and based on the mols of titanous ion, one to three mols of a complexing agent selected from the group consisting of sodium pyrophosphate, potassium pyrophosphate, ethylenediamine tetraacetic acid, and alkali metal and ammonia salts thereof, N-hydroxyethylethylenediamine triacetic acid, tartaric acid, citric acid, trisodium phosphate, potassium fluoride, potassium oxalate, and polyoxyethylene sorbitan monooleate.

References Cited in the file of this patent

UNITED STATES PATENTS

| | | |
|---|---|---|
| 2,380,473 | Stewart | July 31, 1945 |
| 2,380,477 | Stewart | July 31, 1945 |
| 2,416,461 | Stewart | Feb. 25, 1947 |
| 2,554,681 | Neklutin | May 29, 1951 |
| 2,567,109 | Howard | Sept. 4, 1951 |
| 2,614,098 | Uraneck et al. | Oct. 14, 1952 |
| 2,834,760 | Orr et al. | May 13, 1958 |
| 2,908,665 | Reynolds et al. | Oct. 13, 1959 |

OTHER REFERENCES

Williams: Rubber Age, April 1949, page 55.

Neklutin et al.: Rubber Age, volume 66, No. 6, page 672, 1950.